US011765130B2

(12) United States Patent
Wisgo

(10) Patent No.: US 11,765,130 B2
(45) Date of Patent: *Sep. 19, 2023

(54) PROVIDING MICRO FIREWALL LOGIC TO A MOBILE APPLICATION

(71) Applicant: Citrix Systems, Inc., Fort Lauderdale, FL (US)

(72) Inventor: Jeffrey David Wisgo, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/559,400

(22) Filed: Dec. 22, 2021

(65) Prior Publication Data

US 2022/0116358 A1    Apr. 14, 2022

Related U.S. Application Data

(63) Continuation of application No. 16/224,075, filed on Dec. 18, 2018, now Pat. No. 11,228,563.

(51) Int. Cl.
*H04L 9/40*    (2022.01)

(52) U.S. Cl.
CPC ...... *H04L 63/0218* (2013.01); *H04L 63/0254* (2013.01); *H04L 63/0263* (2013.01)

(58) Field of Classification Search
CPC ............. H04L 63/0218; H04L 63/0254; H04L 63/0263; H04W 12/088
See application file for complete search history.

(56) References Cited

U.S. PATENT DOCUMENTS

| | | | |
|---|---|---|---|
| 9,584,476 B2 | 2/2017 | Liang | |
| 11,349,812 B2* | 5/2022 | Biradar | ................... H04L 63/14 |
| 2005/0273850 A1 | 12/2005 | Freund | |
| 2014/0181518 A1 | 6/2014 | Kim et al. | |
| 2017/0026383 A1 | 1/2017 | Hayton et al. | |
| 2017/0353498 A1 | 12/2017 | Huang et al. | |
| 2018/0144263 A1 | 5/2018 | Saxena et al. | |
| 2018/0157524 A1* | 6/2018 | Saxena | ............... G06F 9/45558 |
| 2018/0287999 A1* | 10/2018 | Kaushik | ............. H04L 63/0209 |
| 2019/0068640 A1 | 2/2019 | Araujo et al. | |

(Continued)

OTHER PUBLICATIONS

Examination Report on EP Appl. No. 19216611.4 dated May 16, 2022.

(Continued)

*Primary Examiner* — Han Yang

(57) ABSTRACT

Systems and methods for implementing a micro firewall in a mobile application are provided here. Firewall logic can be injected or provided to a mobile application. The firewall logic can provide one or more rules for processing network traffic from application programming interfaces (APIs) of the mobile application. The mobile application having the firewall logic can be made available for installation on a mobile device. The mobile application having the firewall logic can be provided or installed on to a mobile device. During execution of the mobile application, the firewall logic of the mobile application can hook a plurality of API calls of the mobile application relevant to network traffic. The firewall logic can apply one or more rules of the firewall logic to process network traffic corresponding to an API call of the plurality of API calls of the mobile application.

20 Claims, 4 Drawing Sheets

(56) References Cited

U.S. PATENT DOCUMENTS

2019/0132289 A1 5/2019 Hulick, Jr.

OTHER PUBLICATIONS

Advisory Action on U.S. Appl. No. 16/224,075 dated Aug. 19, 2021.
Anonymous: "Application firewall—Wikipedia", Sep. 15, 2018 (Sep. 15, 2018), XP055674710, Retrieved from the Internet: URL:https://en.wikipedia.org/w/index.php?title=Application_firewall&oldid=859723351 [retrieved on Mar. 29, 2020].
Anonymous: "Hooking—Wikipedia", Oct. 21, 2018 (Oct. 21, 2018), XP055670273, Retrieved from the Internet: URL:https://en.wikipedia.org/w/index.php?title= Hooking&oldid=865113868 [retrieved on Feb. 19, 2020].
Emile-Hugo, "How to build a WAF at the application layer", https://blog.sqreen.com/how-to-build-a-waf-at-the-application-layer/, Sqreen Product, Sep. 2019, 8 pages (Year: 2019).
European Examination Report on EP Appl. 19216611.4 dated Oct. 8, 2021.
Extended Search Report for EP Appl. No. 19216611.4, dated Mar. 20, 2020.
Final Office Action on U.S. Appl. No. 16/224,075 dated Jun. 1, 2021.
Non-Final Office Action on U.S. Appl. No. 16/224,075 dated Feb. 3, 2021.
Notice of Allowance on U.S. Appl. No. 16/224,075 dated Sep. 9, 2021.
Pierre, "Security in depth: introducing In-App WAF and App Inventory", https://blog.sqreen.com/security-in-depth-introducing-in-app-waf-and-app-inventory/, Sqreen Product, Sep. 2019, 6 pages (Year: 2019).

* cited by examiner

PROVIDING MICRO FIREWALL LOGIC TO A MOBILE APPLICATION

CROSS-REFERENCE TO RELATED APPLICATION

This application is a continuation of and claims priority to and the benefit of U.S. patent application Ser. No. 16/224,075, titled "PROVIDING MICRO FIREWALL LOGIC TO A MOBILE APPLICATION," and filed on Dec. 18, 2018, the contents of all of which are hereby incorporated herein by reference in its entirety for all purposes.

BACKGROUND

Mobile and personal computer devices can be an important part of a work environment. However, the mobile and personal computer devices can include critical data that can be improperly accessed, leaked, or modified via the respective device. Further, the freedom that a personal computer devices provide can increase the security risk that sensitive data stored on them can be vulnerable to security attacks. Thus, network administrators may not be able to properly monitor and manage the personal computer devices having critical data.

SUMMARY

Systems and methods for injecting network firewall logic into an application are provided herein. For example, a mobile application can be compiled or published having firewall logic included therein. The firewall logic can perform network traffic filtering, monitoring, blocking, or redirecting while executing within the application. The firewall logic can apply firewall rules and actions at the application itself to identify malicious or harmful activity at the application and independent of a network device or a special firewall application set up on the client device executing the application. Thus, the firewall logic can provide firewall functionality for a mobile application executing on a mobile device independent of a network device or a special firewall application.

In one aspect, this disclosure is directed to a method for implementing a micro firewall in a mobile application. The method can include identifying a mobile application for which to include firewall logic. The firewall logic can provide one or more rules for processing (e.g., filtering, monitoring or redirecting) network traffic from application programming interfaces (APIs) of the mobile application. The method can include injecting into the mobile application the firewall logic. The mobile application can include the firewall logic available for installation on a mobile device. The method can include installing, the mobile application, on to a mobile device. The method can include executing, by the mobile device, the mobile application, the firewall logic of the mobile application to hook a plurality of application programming interface (API) calls of the mobile application relevant to network traffic. The method can include applying, the one or more rules of the firewall logic, to process network traffic corresponding to an API call of the plurality of API calls of the mobile application.

In some embodiments, the method can include using a wrapping toolkit to inject the firewall logic into a binary form of the mobile application. The method can include providing the firewall logic in a source code form of the mobile application and compiling the source code of the mobile application with the firewall logic. The firewall logic can include the one or more rules. The firewall logic can obtain the one or more rules dynamically from a second device during at least one of time of injection or time of execution. In some embodiments, the firewall logic can establish one or more threads to monitor one or more API calls of the plurality of API calls.

In another aspect, this disclosure is directed to a method for executing a micro firewall in a mobile application. The method can include executing, on a mobile device, a mobile application instrumented with a micro firewall. The micro firewall can include one or more rules for processing (e.g., filtering, monitoring or redirecting) network traffic from application programming interfaces (APIs) of the mobile application. The method can include hooking, by the micro firewall of the mobile application, a plurality of application programming interface (API) calls of the mobile application relevant to network traffic. The method can include detecting, by the micro firewall, that an API call of the plurality of API calls made within the mobile application trigger a rule of the one or more rules. The method can include applying, by the micro firewall, an action of the rule to the API call.

In some embodiments, the micro firewall can be instrumented in the mobile application by injection of firewall logic into the mobile application. The micro firewall can include the one or more rules. The micro firewall can obtain the one or more rules dynamically from a second device during execution.

In some embodiments, the method can include hooking, by the micro firewall, the plurality of API calls to apply the one or more rules to the plurality of API calls when called by the mobile application. The method can include establishing, by the micro firewall, one or more threads to monitor one or more API calls of the plurality of API calls. The action of the rule can include one or more of the following: blocking one of type of destination or data, forwarding network traffic of the API call to a monitor service, and redirecting a domain name or internet protocol address from a remote location to a local location.

In another aspect, this disclosure is directed to a system for using a micro firewall in a mobile application. The system can include a mobile application instrumented with a micro firewall configured to execute on one or more processors coupled to memory of a mobile device. The micro firewall can include one or more rules for processing (e.g., filtering, monitoring or redirecting) network traffic from application programming interfaces (APIs) of the mobile application. The micro firewall of the mobile application can be configured to hook a plurality of application programming interface (API) calls of the mobile application relevant to network traffic. The micro firewall of the mobile application can be configured to detect that an API call of the plurality of API calls made within the mobile application trigger a rule of the one or more rules. The micro firewall of the mobile application can be configured to apply an action of the rule to the API call.

In some embodiments, the micro firewall can be instrumented in the mobile application by injection of firewall logic into the mobile application. The micro firewall can include the one or more rules. The micro firewall can be configured to obtain the one or more rules dynamically from a second device during execution. In some embodiments, the micro firewall can be further configured to hook the plurality of API calls to apply the one or more rules to the plurality of API calls when called by the mobile application.

In some embodiments, the micro firewall can be further configured to establish one or more threads to monitor one or more API calls of the plurality of API calls. The action of the rule can include one or more of the following: blocking one of type of destination or data, forwarding network traffic of the API call to a monitor service, and redirecting a domain name or internet protocol address from a remote location to a local location.

The details of various embodiments of the invention are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes embodiments of systems and methods for implementing a micro firewall in a mobile application and executing the micro firewall in the mobile application.

A. Computing Environment

Prior to discussing the specifics of embodiments of the systems and methods detailed herein in Section B, it may be helpful to discuss the computing environments in which such embodiments may be deployed.

Figure 1:
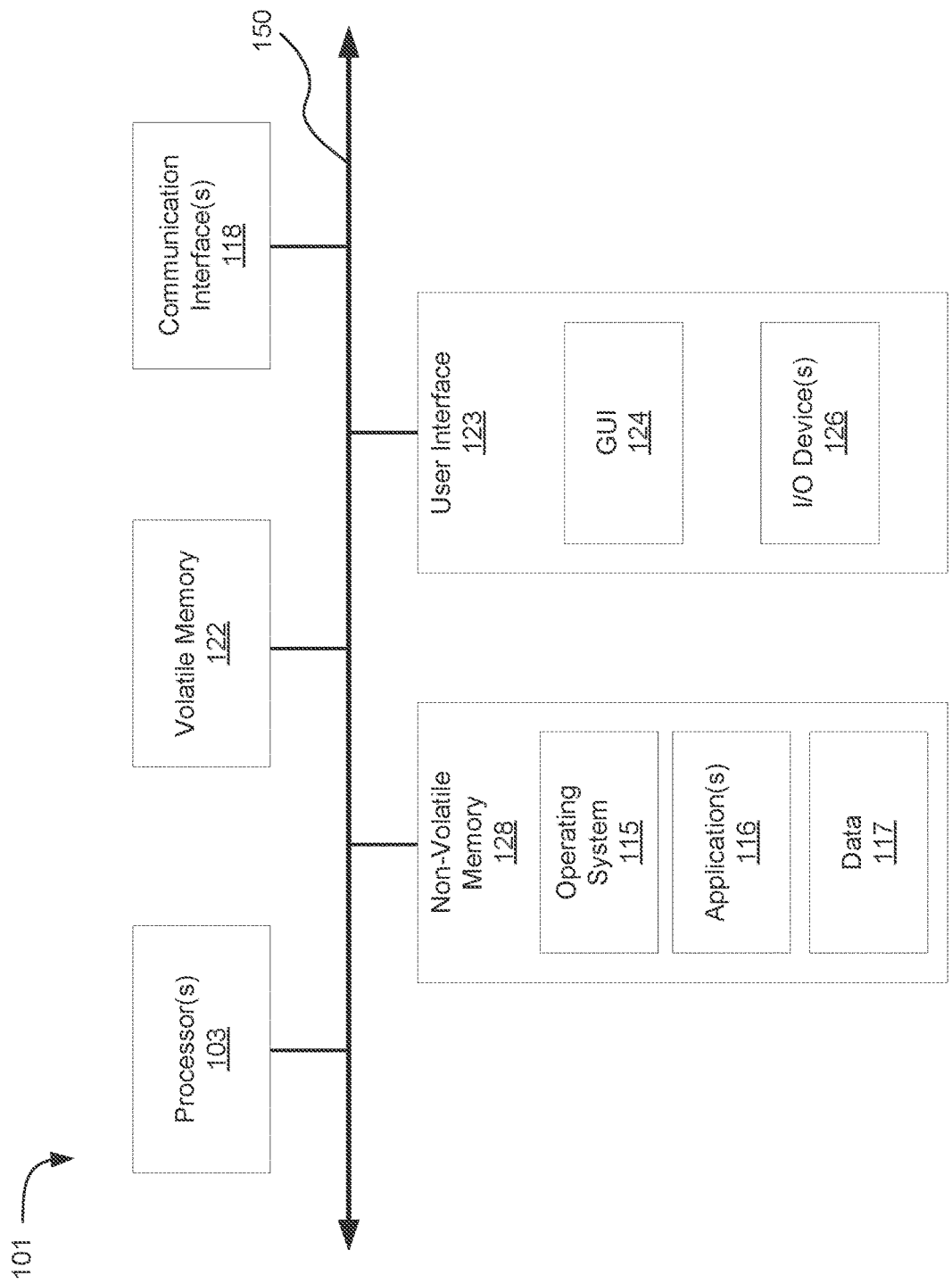
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Implementing a Micro Firewall in a Mobile Application and Executing the Micro Firewall in the Mobile Application The systems and methods described herein can inject or otherwise provide a micro firewall logic (also referred to herein as "firewall logic) to an application, such as a mobile application executing on a client device. The firewall logic, also referred to herein as a micro firewall, can be provided to the application to perform network traffic filtering, monitoring, blocking, or redirecting from the application itself, as opposed to being performed by a device separate from the application or a special firewall application set up on the client device executing the application.

For example, client devices can include stored data from environments, such as work environments, that an administrator can have concerns about such critical data being improperly accessed, leaked, or modified via the client devices. In network communications between the client device and an internal enterprise (e.g., intranet device), the data transmitted in both directions can be monitored and managed via a virtual private network (VPN) or micro VPN solutions. However, the VPN can have required an independent device to perform the network management, resulting in high set up and maintenance costs. Further, and in some embodiments, the VPN policies can be configured to redirect data to non-enterprise to the client devices local network such that the VPN no longer monitors the redirected data. In some embodiments, when the data is piped through the VPN device there can be performance degradation due to the amount of data or a user may have other ways to get around the filtering.

Thus, the firewall logic provided to the applications as described herein, provides for filtering, monitoring, and redirection to occur at the application itself instead of being performed at a VPN device or other form of backend server or device. The firewall logic can perform the firewall processing locally at the application executing on the client device. The firewall logic can perform the filtering using the VPN's rules, policies or requirements to ensure the filtering at the application is in compliance with the respective VPNs security protocols. In some embodiments, by filtering at the application itself through the firewall logic, undesirable or malicious traffic or data can be stopped or otherwise prevented sooner as opposed to performing the filtering at a network device or VPN device. The amount of computer resources and network bandwidth used to perform firewall processing can be reduced by providing the firewall logic to the application itself.

In embodiments, the firewall logic can be generated having a plurality of firewall rules corresponding to a VPN or network environment. The firewall logic can be injected into or otherwise provided to an application (e.g., mobile application) by a firewall manager of a management server. A client device can download or be provided the application having the firewall logic. The firewall logic can execute within the application, for example, by interacting with application program interfaces (APIs) called by the application itself or the operating system of the client device. For example, the firewall logic (e.g., micro firewall) can perform filtering, monitoring, and redirecting operations for the respective application independent of the device that generated the firewall logic, a VPN application or other forms of VPN support in the operating system of the client.

The filtering performed by the firewall logic can include, but is not limited to, filtering network traffic going to or coming from certain IP addresses or domain names (e.g., fully qualified domain names (FQDN)). In some embodiments, the firewall logic can block or prevent network traffic from going to certain IP addresses or domain names or prevent network traffic from being received from certain IP addresses or domain names. The firewall logic can generate an error message for a user of the client to indicate the filtering of the corresponding network traffic. In some embodiments, the firewall logic can block or prevent certain types of data. The monitoring performed by the firewall logic can include, but is not limited to, monitoring of network traffic being received at or being transmitted from the application itself. For example, the firewall logic can locally log or track the network traffic being received at or being transmitted from the application. The firewall logic can transmit the locally logged network traffic data to an external site, such as the intermediary device, for metrics and analysis purposes. The redirecting performed by the firewall logic can include, but is not limited to, redirecting traffic from certain IP addresses or domain names. For example, the firewall logic can redirect the network traffic from certain IP addresses or domain names on a local network of the client. In some embodiments, the redirection can include changing a subnet address from a first subnet address to a second, different subnet address. In some embodiments, the redirection can include changing a domain name from a first domain name to a second, different domain name.

Figure 2:
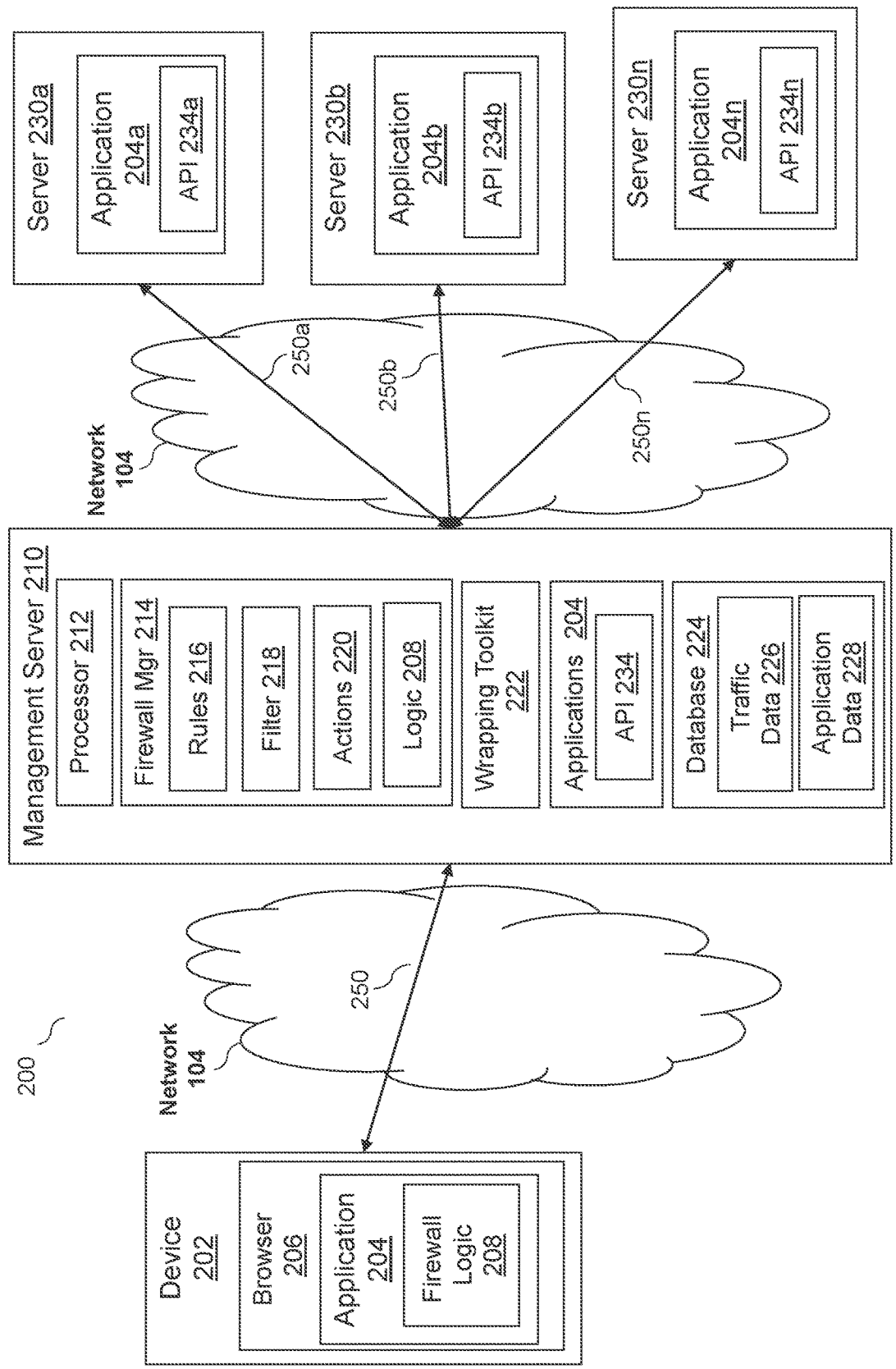
FIG. 2 is a block diagram of a system for using a micro firewall in a mobile application.

Referring to FIG. 2, depicted is a block diagram of one embodiment of a system 200 for providing firewall logic 208 to one or more mobile applications 204a-204n (e.g., applications 204a-204n). A management server 210 can include a processor 212 and a firewall manager 214 for generating and applying firewall logic 208 to applications 204a-204n available to or executing on one or more devices 202. The management server 210 can manage and control access to and execution of one or more applications 206 for one or more devices 202 coupled with the management server 210 or the plurality of third party servers 230a-230n (e.g., server 230a-230n) through a network 203.

The management server 210 can include the firewall manager 214 to generate the firewall logic 208 and inject the firewall logic 208 into applications 206a-206n provided to the device 202. The firewall logic 208 can perform filtering, monitoring, and redirecting operations for the respective application 204. In some embodiments, the firewall logic 208 can perform filtering, monitoring, and redirecting operations independent of the management server 210 and the firewall manager 214.

The management server 210 may correspond to or include a processor 212 configured to manage properties of applications 204a-204n within the network 203. The processor 212 can include non-volatile memory that stores computer instructions and an operating system. For example, the computer instructions can be executed by the processor 212 out of volatile memory to perform all or part of the method 300. The management server 210 can include a network device or VPN device for managing network traffic within the network 203 between the device 202 and the plurality of servers 230a-230n. The management server 210 can monitor the access to, publishing of, downloading of, execution of, or other forms of interactions between an application 204 provided by at least one server 230 and the device 202. In some embodiments, the management server 210 may be transformed into a special-purpose microprocessor by executing computer-executable instructions or by otherwise being programmed.

The firewall manager 214 can include a processor to generate firewall rules 216, firewall filters 218, firewall actions 220 and firewall logic 208. The firewall manager 214 can execute on the application server 202. In some embodiments, the firewall manager 214 may be transformed into a special-purpose microprocessor by executing computer-executable instructions or by otherwise being programmed. The firewall logic 208 can include or correspond to a firewall module or firewall agent inject into or provided with an application 204. The firewall logic 208 can include a processor configured to apply one or more firewall rules 216, one or more firewall filters 218, and one or more firewall actions 220 to network traffic, data or API calls corresponding to an application 204 executing on the device 202. In some embodiments, the firewall logic 208 may be transformed into a special-purpose microprocessor by executing computer-executable instructions or by otherwise being programmed. In some embodiments, the firewall logic 208 can control and monitor an interaction between an application 204 and an API 234 called by the respective application 204. The firewall logic 208 can include one or more firewall rules 216, one or more firewall filters 218, and one or more firewall actions 220. The firewall logic 208 may be referred to herein a firewall module 208 or micro firewall 208.

The firewall rules 216 can include firewall policies for communications (e.g., via sessions 250a-250n) between device 202 and the management server 210, communications (e.g., via sessions 250a-250n) between device 202 and the plurality of servers 230a-230n, and communications (e.g., via sessions 250a-250n) between management server 210 and the plurality of servers 230a-230n. The firewall rules 216 can include network policies or VPN policies for managing a network environment. In some embodiments, the firewall rules 216 can include restrictions within the network 203 based in part on data types, IP addresses, domain names or other forms of networking identifiers. For example, the firewall rules 216 can include a listing of allowed data types, allowed IP addresses, allowed domain names, allowed APIs 234a-234n, allowed API functionality, and/or other forms of allowed networking identifiers. The firewall rules 216 can include a listing of restricted data types, restricted IP addresses, restricted domain names, restricted APIs 234a-234n, restricted API functionality or other forms of restricted networking identifiers.

The firewall filters 218 can include a processor, functions, protocols or instructions for passing or blocking data (e.g., packets) at an interface of the network 203. For example, the firewall logic 208 can execute a firewall filter 218 to manage data received at or transmitted by an application 204 executing on a device 202. In some embodiments, the firewall filters 218 can inspect or examine properties of data (e.g., header packets, portions of a packet) using one or more firewall rules 216 to determine whether to allow or block the corresponding data from being received at or transmitted by an application 204 executing on a device 202. The firewall logic 208 can execute the firewall filter 218 to filter network traffic or data based in part on an intended IP address, domain name or server 230 (e.g., third party server). The firewall logic 208 can execute the firewall filter 218 to filter the network traffic or data based in part on an IP address, domain name or server 230 (e.g., third party server) that transmitted the network traffic.

The firewall actions 220 can include responses to applied firewall rules 216. For example, the firewall actions 220 can include an action the firewall logic 208 is to perform responsive to a firewall rule 216 being applied to network traffic, data or API call. The firewall actions 220 can include functions, protocols or instructions to instruct the firewall logic 208 what action should be performed responsive to a firewall rule 216. For example, the firewall actions 220 can include, but are not limited to, instructions to allow network traffic or data corresponding allowed data types, allowed IP addresses, allowed domain names, allowed APIs 234a-234n, allowed API functionality, and/or other forms of allowed networking identifiers. The firewall actions 220 can include, but are not limited to, instructions to block or prevent network traffic or data corresponding to restricted data types, restricted IP addresses, restricted domain names, restricted APIs 234a-234n, restricted API functionality or other forms of restricted networking identifiers. In some embodiments, the firewall actions 220 can include instructions to redirect network traffic or data from a first IP address to a second IP address, from a first domain name to a second domain name, or from a first subnet address to a second subnet address.

The management server 210 can include a wrapping toolkit 222. The wrapping toolkit 222 can include or correspond to a software developers kit (SDK) having a set of functions, protocols or instructions to modify properties of an application 204. For example, the wrapping toolkit 222 can apply a management layer to an application 204 during compilation of the respective application 204. In some embodiments, the management server can use the wrapping toolkit 222 to set policies to the respective application 204 such that the application 204 can execute or follow the policies when the application 204 is executing on a different device, such as device 202. The firewall manager 214 can execute the wrapping toolkit 222 to inject or include firewall rules 216, firewall filters 218 and the firewall logic 208 into an application 204 and re-deploy or make the application 204 having firewall logic 208 available to the device 210. In an embodiment, the wrapping toolkit 222 can apply, inject or otherwise provide firewall logic 208 into an application during compilation of the respective application 204.

The management server 210 can include a database 224. The database 224 can include or correspond to a database server. The database 224 can be a component of the management server 210 or subcomponents of the components within management server 210. In some embodiments, the database 224 can be an external database server coupled with the management server 210 through the network 203. Each of management server 210, firewall manager 214, and database 224 may be implemented or associated with hardware components, software components, or firmware components or any combination of such components. The management server 210, firewall manager 214, and database 224 can, for example, be implemented or associated with servers, software processes and engines, and/or various embedded systems.

The database 224 can store, organize and maintain data generated, transmitted by or received by the management server 210 and the firewall manager 214. For example, the database 224 can include network traffic data 226 and application data 228. The network traffic data 226 can include network calls or API calls from an application 204 to one or more APIs 234a-234n through network 203. The network traffic data 226 can include communications between the device 202 and the management server 210, communications between the device 202 and the plurality of servers 230a-230n, and communications between the management server 210 and the plurality of servers 230a-230n. The network traffic data 226 can include requests from applications 204a-204n executing on the device 202. The network traffic data 226 can include responses from the management server 210 or the firewall manager 214 to the requests from the applications 204a-204n.

The application data 228 can include data corresponding to the applications 204a-204n provided by servers 230a-230n and an application 204 executing on the device 202. The application data 228 can correspond to mobile application data 208. The application data 228 can include static application data and dynamic application data. The static application data can include data inputted by an administrator or application generator when the application 204 is compiled or published. The static application data can include meta data extracted from a mobile application package, for example, when the application 204 is being compiled or published. In some embodiments, the static application data can include an application name, minimum version of the application 204, maximum version of the application 204, APIs 234a-234n used by or corresponding to the application 204, file size data, and/or security capabilities of the application 204. The dynamic application data can include or correspond to application data 228 generated by an application 204 during execution (e.g., run time) of the application 204 on a device 202. The dynamic application data can include APIs 234a-234n called or requested by the application 204, security permission requests generated by the application 204, application running process data, disk space data, memory data, CPU usage, battery usage, and/or open socket data. The application data 228 can include network traffic data or VPN data corresponding to the application 204.

In some embodiments, the management server 210 can include one or more applications 204a-204n and one or more APIs 234a-234n. The applications 204a-204n can correspond to applications 204 to be wrapped or injected with firewall logic 208. The APIs 234a-234n can include APIs associated with or used by the applications 204a-204n to be wrapped or injected with firewall logic 208. The management server 210 can receive the applications 204a-204n and the APIs 234a-234n from the plurality of servers 230a-230n. The APIs 234a-234n can include APIs 234 called by, accessed by or interacted with by one or more applications 204a-204n provided by the plurality of servers 240a-240n. In some embodiments, the management server 210 can track and log the APIs 234s 234a-234n called by, accessed by or interacted with by the applications 204a-204n executing on device 202 or executing with network 203.

The device 202 can include a client device, such as, but not limited to a mobile device. The device 202 can couple with the management server 210 and the plurality of servers 230a-230n through network 203. The device 202 can include or correspond to an instance of any client device, mobile device or computer device described herein. For example, the device 202 can be the same as or substantially similar to computer 101 of FIG. 1. The device 202 can include a browser 206 for accessing, downloading or interacting with an application 204. For example, the device 202 with the browser 206 can include a CEB (e.g., client embedded browser). The browser 206 can include elements and functionalities of a web browser application or engine. The browser 206 can locally render one or more of application 204a-204n as a component or extension of systems of the device 202. For example, the browser 206 can render a SaaS/Web application inside the CEB which can provide the CEB with full visibility and control of at least one application session executing on device 202. The device 2020 can couple with the management server 210 and the plurality of servers 230a-230n to download at least one application 204 having firewall logic 208.

The device 202 can execute or run the application 204 based in part on rules 216 and filters 218 corresponding to the firewall logic 208 injected or provided with the application 204. The application 204 executing on the device 202 can include the firewall logic 208. The firewall logic 208 can perform network traffic filtering, monitoring, blocking, or redirecting from the application 204 itself, as opposed to being performed by the management server 210. For example, the device 202 can download or be provided the application 204 having the firewall logic 208 and the firewall logic 208 can execute within the application 204, for example, by interacting with APIs 234a-234n called by the application 204 itself or the operating system of the device 202. In some embodiments, the firewall logic 208 can perform filtering using firewall rules 216 and firewall filters 218. The firewall rules 216 and firewall filters 218 can correspond to network or VPN policies to ensure the filtering at the application 204 by the firewall logic 208 is in compliance with the respective network or VPN security protocols.

In some embodiments, the management server 210 can establish one or more of sessions 250a-250n to one or more of applications 204a-204n (e.g., network applications). For example, the management server 210 can establish one or more of sessions 250a-250n to one or more of applications 204a-204n through the browser 206 and network 203 for the device 202. The sessions 250a-250n may include, but are not limited to, an application session, an execution session, a desktop session, a hosted desktop session, a terminal services session, a browser session, a remote desktop session, a URL session and a remote application session. Sessions 250a-250n may include encrypted and/or secure sessions established between an application 204 and the device 202. For example, the sessions 250a-250n may include encrypted URL sessions and/or secure URL sessions established between at least one application 204 and the device 202 through the network 203 (e.g., VPN network 203). The encrypted URL sessions 250a-250n can include encrypted data or traffic transmitted between at least one application 204 and the device 202 through the network 203.

The applications 204a-204n may include applications (apps) that are served from and/or hosted on one or more servers, here servers 230a-230n (e.g., third party servers). The applications 204a-204n can include an application 204 hosted on at least one server 230 accessed by the device 202 via the network 203. The applications 204a-204n may include applications (apps) that are served from and/or hosted on one or more servers 230a-230n, such as, but not limited to, web applications, software-as-a-service (SaaS) applications, and/or remote-hosted applications. The applications 204a-204n can include, but are not limited to, a web application, a desktop application, remote-hosted application, a virtual application, a software as a service (SaaS) application, a mobile application, an HDX application, a local application, and/or a native application (e.g., native to the device 202). The applications 204a-204n can include one or more APIs 234a-234n. The APIs 234a-234n can include a function, protocol or set of instructions for controlling interactions between an application 204 and the device 202, the management server 210, and/or the firewall manager 214. In some embodiments, the APIs 234a-234n can provide access to hardware devices and software functions that an application 204 may not necessarily have permission to use or functionality to access. The APIs 234a-234n can include or correspond to an API of an operating system executing on the device 202. For example, the APIs 234a-234n can correspond to an API for providing or invoking a web view within the browser 206 (or native application) executing on the device 202 to control and provide web content corresponding to an application 204.

Network 203 may be a public network, such as a wide area network (WAN) or the Internet. In some embodiments, network 203 may be a private network such as a local area network (LAN) or a company Intranet. Network 203 may be a public network, such as a wide area network (WAN) or the Internet. Network 203 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, device 202 and one or more of servers 230a-230n may be on the same network 203. In some embodiments, device 202 and one or more of servers 230a-230n may be different networks 203. The network 203 can include a virtual private network (VPN). The VPN can include one or more encrypted connections 250a-250n from the device 202 to the management server 210 or the plurality of servers 230a-230n over network 203 (e.g., internet, corporate network, private network).

Each of the above-mentioned elements or entities is implemented in hardware, or a combination of hardware and software, in one or more embodiments. Each component of the management server 210 or firewall manager 214 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the device 202). The hardware includes circuitry such as one or more processors in one or more embodiments.

Figure 3A:
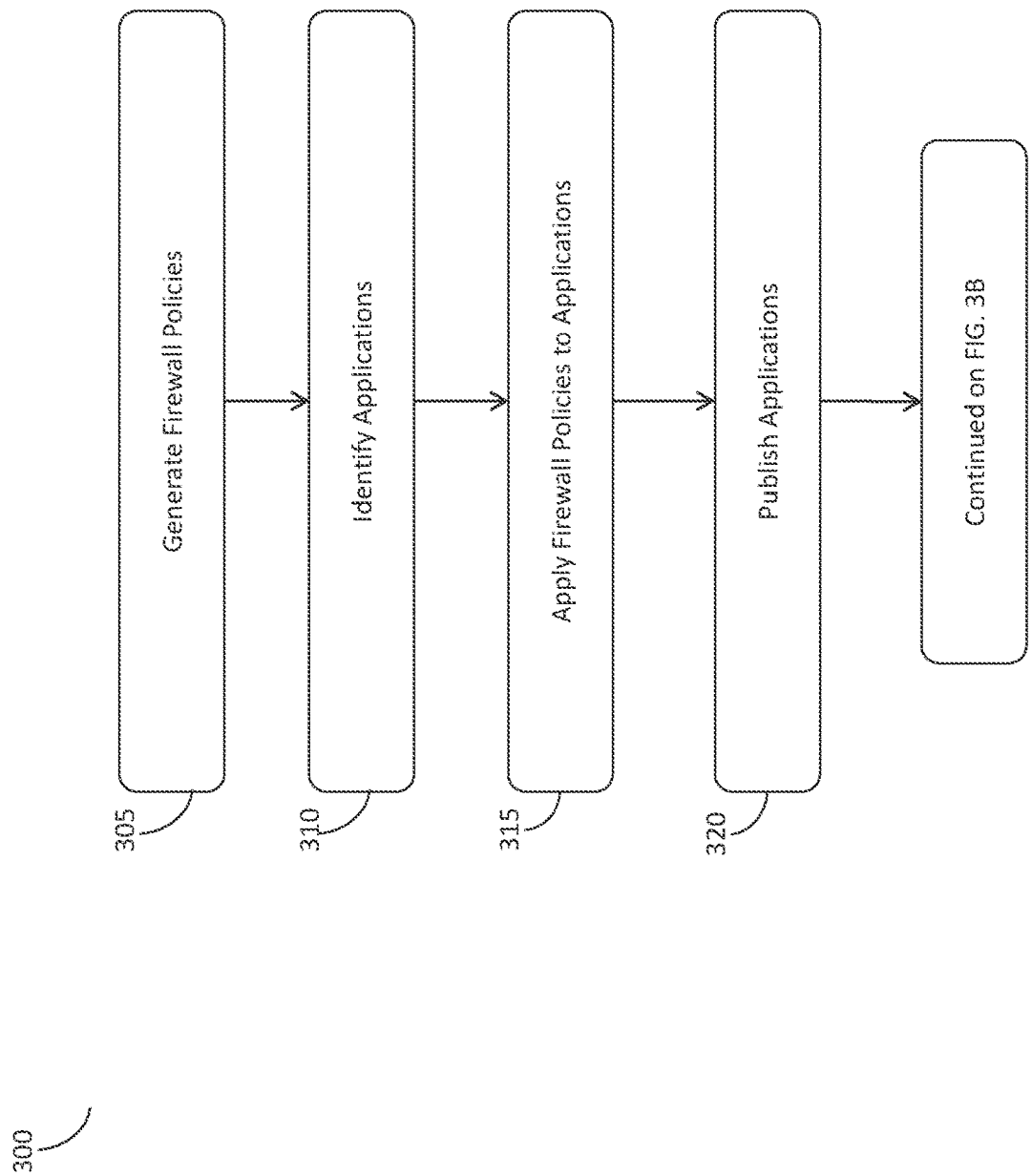
FIGS. 3A-3B are a flow diagram of a method for implementing a micro firewall in a mobile application and executing the micro firewall in the mobile application.
Figure 3B:
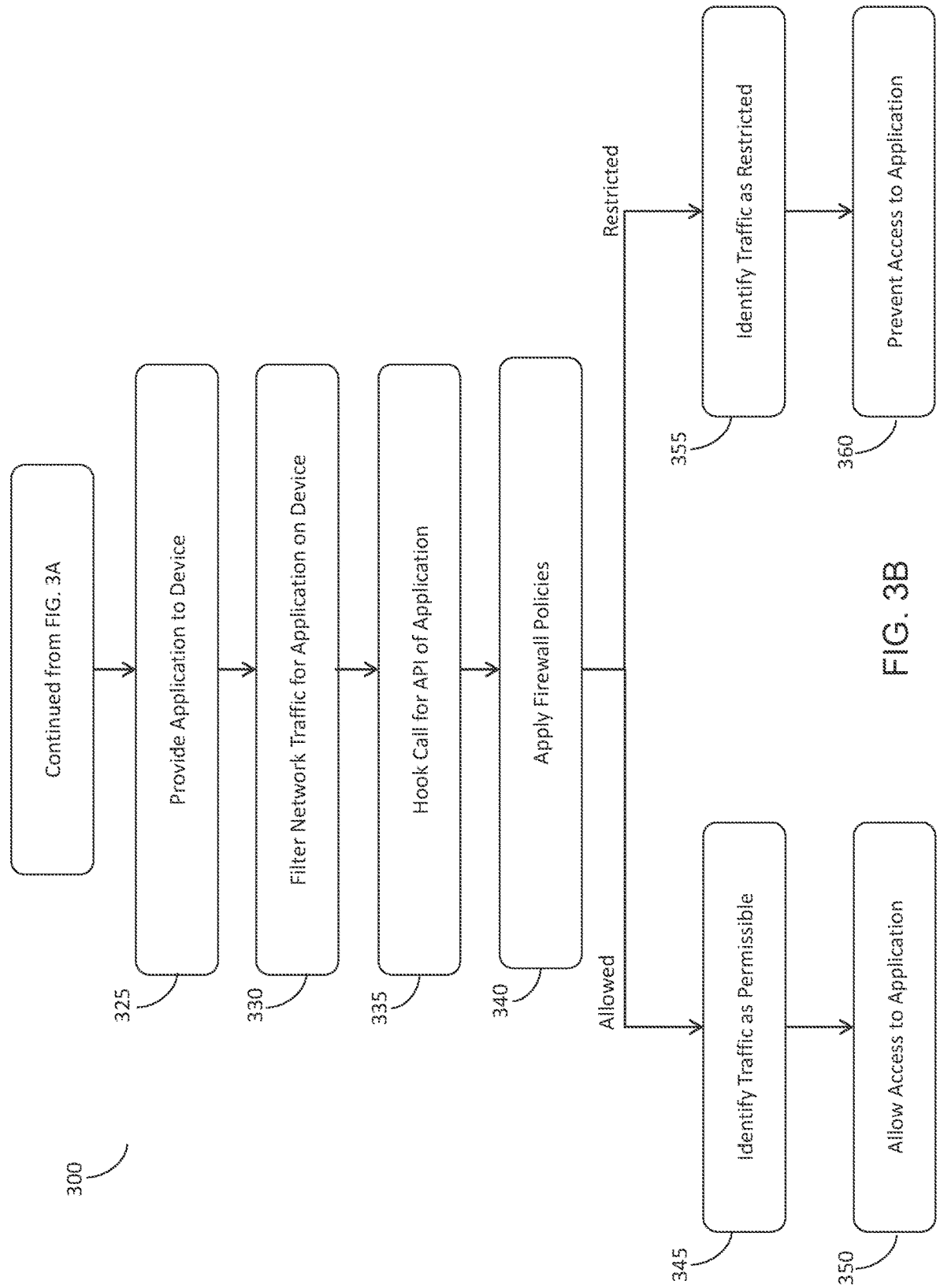

Referring now to FIGS. 3A-3B, depicted is a flow diagram of one embodiment of a method 300 for providing network firewall logic to an application executing on a client. The functionalities of the method 300 may be implemented using, or performed by, the components detailed herein in connection with FIGS. 1-2. In brief overview, firewall policies can be generated (305). Applications can be identified (310). The firewall policies can be applied to one or more applications (315). The applications can be published (320). An application can be provided to a client (325). Network traffic can be filtered for the application on the client (330). A network call from the application to an API can be hooked (335). Firewall policies can be applied to determine if network traffic is allowed or restricted (340). Responsive to the determination, if the network traffic is allowed, the network traffic can be identified as permissible (345). Access to the application can be allowed (350). Responsive to the determination, if the network traffic is restricted, the network traffic can be identified as restricted (355). Access to the application can be prevented (360).

Referring now to operation (305), and in some embodiments, firewall rules 216 can be generated. For example, method 300 can include generating, by a firewall manager 214 executing on a management server 210, firewall rules 216 for a firewall logic 208 executable on the firewall manager 214. The firewall logic 208 can manage and control access for one or more applications 204 executing on the one or more devices 202. The firewall rules 216 can include restrictions for transmitting data from an application 204 executing on the device 202 or receiving data at the application 204 executing on the device 202. For example, the firewall rules 216 can identify data types, IP addresses, domain names or other forms of networking identifiers having different levels of access or restricted access to an application 204 executing on the device 202. The firewall manager 214 can generate firewall rules 216 for an API 234 or a plurality of APIs 234a-234n. For example, the firewall manager 214 can generate firewall rules 216 for specific APIs 234 corresponding to a plurality of applications 204a-204n provided by the firewall manager 214 or by a plurality of servers 230a-230n (e.g., third party servers). The firewall rules 216 can control and monitor an interaction between an application 204 and an API 234 called by the respective application 204.

The firewall manager 214 can generate the firewall rules 216 such that the firewall rules 216 can include or identify a group or subset of restricted APIs 234a-234n. The firewall rules 216 can include or identify different levels of access to an application 204 for a plurality of APIs 234a-234n. For example, firewall rules 216 can identify a first group of APIs 234a-234n having a first level of access to one or more applications 204a-204n, a second group of APIs 234a-234n having a second level of access to one or more applications 204a-532n, and a third group of APIs 234a-234n having a third level of access to one or more applications 204a-204n. The first level of access can be different from the second and third levels of access. The second level of access can be different from the third level of access. In some embodiments, a first level of access can correspond to full access to transmit data to or receive data from an application 204. A second level of access can correspond to a restricted access to transmit data to or receive data from an application 204. For example, an API 234 having a second level of access may be able to transmit or receive a first subset of data and a second subset of data may be blocked from being received at or transmitted to the respective application 204. A third level of access can correspond to the respective API 234 being prevented or blocked from transmitting data to or receiving data from an application 204.

The firewall rules 216 can include or identify a group or subset of restricted IP addresses or domain names. For example, the group or subset of restricted IP addresses or domain names can be restricted from transmitting data to an application 204 executing on the device 202 or from receiving data from an application 204 executing on the device 202. The firewall rules 216 can identify one or more types of restricted data (e.g., images). The firewall rules 216 can identify different levels of access to one or more applications 204 based in part on IP addresses, domain names, or data types. The firewall manager 214 can generate the firewall rules 216 in the form of or included within a firewall logic 208. For example, the firewall logic 208 can include a set of instructions corresponding to firewall rules 216 to be executed by a computing device (e.g., device 202) when the respective firewall logic 208 is executing on the respective computing device. In some embodiments, the firewall logic 208 can correspond to a local firewall binary file (e.g., local to firewall manager 214, local to device 202, local to server 230) or meta data file of a software developers kit (SDK) or wrapping toolkit. For example, in some embodiments, the firewall manager 214 can generate and include the firewall rules 216 in a local firewall binary file or meta data file of a software developers kit (SDK) or wrapping toolkit to form the firewall logic 208. The device 202 can modify one or more data structures, include new data structures, or rebuild existing data structures of the local firewall binary file or meta data file to form the firewall logic 208.

Referring now to operation (310), and in some embodiments, applications 204a-204n can be identified. For example, method 300 can include identifying a mobile application 204 for which to include firewall logic 208. The firewall logic 208 can provide one or more rules 216 for processing network traffic corresponding to at least one API 234. For example, the firewall logic 208 can provide one or more rules 216 for one of filtering, monitoring or redirecting network traffic from APIs 234a-234n to the mobile application 204. In some embodiments, the firewall manager 214 can identify one or more applications 204a-204n to apply or provide the firewall rules 216. The firewall manager 214 can determine which applications 204a-204n should have firewall rules 216 applied to them. The determination can be made, in part, based on a type of the application 204 or a server 230 that provides or hosts the application 204. For example, an application 204 corresponding to a work environment or secure environment that processes critical data or encrypted data can be identified as needing firewall rules 216. The firewall manager 214 can determine which applications 204a-204n should have firewall rules 216 based in part on a user history of a device 202. For example, the firewall manager 214 can determine that one or more applications 204a-204n previously executed by the device 202 may need firewall rules 216 based on the types of data previously received at or previously transmitted from the one or more applications 204a-204n during execution by the device 202. The firewall manager 214 can identify one or more applications 204a-204n for firewall rules 216 based in part on an API 234 corresponding to the one or more applications 204a-532n, IP addresses corresponding to the one or more applications 204a-532n, domain names corresponding to the one or more applications 204a-204n, or the servers 230a-230n that provide the one or more applications 204a-204n.

Referring now to operation (315), and in some embodiments, the firewall rules 216 can be applied to one or more applications 204a-532n. For example, method 300 can include injecting into the mobile application 204 the firewall logic 208. The mobile application 204 can include the firewall logic 208 and be available for installation on a mobile device 202. In some embodiments, the method 300 can include applying, by the firewall manager 214, the firewall logic 208 having the firewall rules 216 to an application 632 of the one or more applications 204a-532. The firewall manager 214 can inject or provide the firewall logic 208 to an application 204 such that the firewall logic 208 can perform filtering, monitoring, and redirection at the application 204 itself. In some embodiments, the firewall manager 214 can code or hardcode the firewall logic 208 having the firewall rules 216 into a software development kit (SDK) corresponding to the application 204.

In some embodiments, the firewall manager 214 can use a wrapping toolkit 222 to inject the firewall logic 208 into a binary form of the mobile application 206. In some embodiments, the firewall manager 214 can include the firewall logic 208 in a source code form of the mobile application 204 and compile the source code of the mobile application 204 with the firewall logic 208. For example, the firewall manager 214 can code the firewall logic 208 into wrapping logic, wrapping tool kit or a subroutine that can be injected or provided to the application 204. In some embodiments, the firewall manager 214 can compile the application 204 after adding, injecting or otherwise providing the firewall logic 208 in the form of a SDK. The firewall manager 214 can retrieve the firewall logic 208 and/or firewall policies from an external server (e.g., backend server) and apply the firewall logic 208 to the application 204. For example, in some embodiments, the firewall manager 214 can retrieve the firewall logic 208 and/or firewall rules 216 from a server 230 that generated or hosts the application 204. In some embodiments, the firewall manager 214 can retrieve the firewall logic 208 and/or firewall rules 216 from a server 230 that stores or maintains security protocols for the network 104 and/or the firewall manager 214. In some embodiments, the firewall logic 208 can obtain the one or more rules 216 dynamically from a second device during one of injection or execution. For example, the firewall logic 208 can obtain the rules 216 from a server 230 or second device 202 that is different from the device 202 that is executing the application having the firewall logic 208.

Referring now to operation (320), and in some embodiments, the applications 204a-204n can be published. In some embodiments, the firewall manager 214 can publish or provide an application 204 having a firewall logic 208 to one or more server 230a-230n. For example, the firewall manager 214 can publish or provide an application 204 having a firewall logic 208 to a server 230 that generated or hosts the respective application 204. In some embodiments, the firewall manager 214 can publish or provide the application 204 having the firewall logic 208 to multiple servers 230a-230n. The firewall manager 214 can publish or provide the application 204 having the firewall logic 208 to one or more servers 230a-230n to make the respective application 204 available to one or more devices 202, for example, for download. For example, the firewall manager 214 can install the application 204 having the firewall logic 208 on one or more servers 230a-230n. In some embodiments, the firewall manager 214 can publish or release an application binary corresponding to the application 204. For example, the firewall manager 214 can publish or release an application binary corresponding to the application 204 to a server 230 hosting or providing an application marketplace (e.g., app store). The firewall manager 214 can publish or release application binary corresponding to the application 204 to a server 230 that is an enterprise application server coupled with or corresponding to the firewall manager 214.

Referring now to operation (325), and in some embodiments, an application 204 can be provided to a device 202. For example, the method 300 can include installing, the mobile application 204, on to a mobile device 202. In some embodiments, the method 300 can include providing, by the firewall manager 214 through an application server 230, the application 204 having the firewall logic 208 to a device 202 (e.g., mobile device). The application server 230 can generate, host or provide the one or more applications 204a-204n. In some embodiments, the firewall manager 214 can receive a request from the device 202 through a client application 504 executing on the device 202. The request can indicate an application 204 or a server 230 that hosts a plurality of applications 204a-204n. The firewall manager 214 can identify an application server 230 of the plurality of servers 230a-230n that hosts or provides the requested application 204. The firewall manager 214 can identify an application 204 that corresponds to the requested application 204 and then determine which application server 230 hosts or provides the requested application 204. The firewall manager 214 can determine that the application 204 has been modified to include the firewall logic 208 and thus is safe for providing to the device 202. The firewall manager 214 can transmit to the application 204 having the firewall logic 208 to the device 202.

In some embodiments, the firewall manager 214 can make the application 204 having the firewall logic 208 available for download by the device 202 through the firewall manager 214 or through the corresponding application server 230. For example, the device 202 (e.g., mobile computing device, handheld computing device) can access the firewall manager 214 that hosts an application marketplace through a browser 206 of the device 202. The device 202 can access an application server 230 though the firewall manager 214 and the browser 206 of the device 202. The device 202 can download the application 204 having the firewall logic 208 using the browser 206 of the device 202 such that the device 202 can execute the application 204 having the firewall logic 208 from the device 202. In some embodiments, the device 202, through the browser 206, can couple with the firewall manager 214 to execute the application 204 having the firewall logic 208. In some embodiments, the device 202, through the browser 206, can couple with an application server 230 to execute the application 204 having the firewall logic 208.

Referring now to operation (330), and in some embodiments, network traffic can be filtered for the application 204 on the device 202. In some embodiments, the method 300 can include executing, on the mobile device 202, the mobile application 204 instrumented with a micro firewall 208. The micro firewall 208 can include one or more rules 216 for one of filtering, monitoring or redirecting network traffic from APIs 234a-234n of the mobile application 204. Responsive to the execution of the mobile application 204 instrumented with a firewall logic 208, the method 300 can include filtering, by the firewall logic 208, network traffic corresponding to the application 204 executing on the device 202. In some embodiments, the firewall logic 208 can execute within the browser 206 of the device 202 when the application 204 is executing on the device 202. The firewall logic 208 can filter network traffic or data transmitted by or received by the application 204 while executing on the device 202. The firewall logic 208 can identify properties of the network traffic or data corresponding to the application 204. For example, the firewall logic 208 can filter the network traffic or data based in part on an intended IP address, domain name or server 230 (e.g., third party server). The firewall logic 208 can filter the network traffic or data based in part on an IP address, domain name or server 230 (e.g., third party server) that transmitted the network traffic.

Referring now to operation (335), and in some embodiments, a network call from the application 204 to an API 234 can be hooked. The method 300 can include executing, by the mobile device 202, the mobile application 204. The firewall logic 208 of the mobile application 204 can hook a plurality of API calls of the mobile application 204 relevant to network traffic. For example, the method 300 can include hooking, by the firewall logic 208, a network call for an API 234 by the application 204 executing on the device 202. The micro firewall 208 of the mobile application 204 can hook a plurality of API calls of the mobile application 204 relevant to network traffic. The firewall logic 208 can include a hooking tool for intercepting network calls performed by the application 204. In some embodiments, the firewall logic 208 can enable or permit hooking of network calls performed by the application 204 by modifying (e.g., swizzling) properties of the network calls or requests generated by the application 204. The application 204 can make a network call to one or more APIs 234a-234n. The network call may be performed by the application 204 using the browser 206. The firewall logic 208 can intercept or hook the network call to identify the one or more requested APIs 234a-234n. Responsive to hooking the network call, the firewall logic 208 can flag the requested API 234 such that network traffic or data associated with the flagged API 234 is monitored by the firewall logic 208. In some embodiments, the firewall logic 208 can hook a plurality of requests for APIs 234a-234n from the application 204.

In some embodiments, when the application 204 is running or executing on the device 202, the firewall logic 208 can engage hooks such that networks calls performed by the application 204 are intercepted or monitored. For example, responsive to hooking the network call, the firewall logic 208 can monitor calls to the API 234, data transmitted to the API 234, or data from the API 234. The firewall logic 208 can track the calls, network traffic or data corresponding the requested API 234. In some embodiments, the firewall logic 208 can establish one or more threads to monitor one or more API calls of the plurality of API calls. The firewall logic 208 can hook the network call using various hooking techniques, such as, through a low level hooking technique, a direct call through SDK APIs, or a supported hooking technique of the operating system of the device 202. For example, in some embodiments, the firewall logic 208 can enable hooking by modifying (e.g., swizzling) one or more properties of the application 204 or modifying (e.g., swizzling) one or more properties of the operating system of the device 202. In some embodiments, responsive to a hook performed by the firewall logic 208, filtering, monitoring, and/or redirecting logic can be activated by the firewall logic 208 on the network traffic or data corresponding the requested API 234.

Referring now to operation (340), and in some embodiments, the firewall rules 216 can be applied to network traffic determine if the network traffic is allowed or restricted. The firewall rules 216 can be applied to process network traffic corresponding to an APU call of a plurality of API calls of the mobile application 204 to determine if the respective network traffic is allowed or restricted. In some embodiments, the micro firewall 208 or firewall logic 208 can detect that an API call of the plurality of API calls made within the mobile application 204 trigger a rule 216 of the one or more rules 216. For example, method 300 can include applying, the one or more rules 216 of the firewall logic 208, to an API call of the plurality of API calls of the mobile application 204. The method 300 can include applying, by the firewall logic 208, the firewall rules 216 to network traffic associated with the API 234 to control access of the API 234 to the application 204 executing on the device 202. The firewall logic 208, responsive to hooking the network call, can apply firewall rules 216 to the network traffic or data corresponding the requested API 234. The firewall rules 216 can indicate whether the network traffic data is allowed or restricted based at least in part on a type of data, an IP address, domain name, or server 230 associated with the application 204 or requested API 234. In some embodiments, the method 300 can include applying, by the micro firewall 208, an action 220 of the rule 216 to the API call. The action 220 can include allowing, redirecting or restricting (e.g., prevent, block) the network traffic corresponding to the API call. In some embodiments, the action 220 of the rule 216 can include one or more of the following: blocking one of type of destination or data, forwarding network traffic of the API call to a monitor service, and redirecting a domain name or internet protocol address from a remote location to a local location.

Referring now to operation (345), and in some embodiments, responsive to the determination, if the network traffic is allowed, the network traffic can be identified as permissible. For example, the firewall logic 208, using the firewall rules 216 can determine that the network traffic or data is allowed or permissible to be transmitted by or received at the application 204 executing on the device 202. In some embodiments, the firewall logic 208 can use the firewall rule 216 to identify a firewall action 220 including instructions to allow or permit the network traffic or data to be transmitted by or received at the application 204 executing on the device 202. In some embodiments, the firewall logic 208 can assign a level of access to network traffic or data corresponding to an API 234, application 204 or server 230 using the firewall policies. For example, the firewall logic 208 can assign a first type of data from the API 234 a first level of access, a second type of data from the API 234 a second level of access, and a third type of data from the API 234 a third level of access. Thus, different types of data from the same API 234, same application 204 or server 230 can be assigned different levels of access to the device 202.

In some embodiments, the firewall logic 208 can assign a level of access to an IP address, group of IP address, domain name or groups of domain names corresponding to an API 234, application 204 or server 230 using the firewall policies. For example, the firewall logic 208 can assign a first IP address (or first group of IP addresses) a first level of access, a second IP address (or second group of IP addresses) a second level of access, and a third IP address (or third group of IP addresses) a third level of access. The firewall logic 208 can assign a first domain name (or first group of domain names) a first level of access, a second domain name (or second group of domain names) a second level of access, and a third domain name (or third group of domain names) a third level of access. The firewall logic 208 can generate and assign a single level of access (e.g., allowed, full access). The firewall logic 208 can generate and assign two levels of access. The firewall logic 208 can generate and assign three or more levels of access. The firewall logic 208 can use the levels of access to control how network traffic or data form the corresponding IP address or domain name is received at the application 204 or transmitted from the application 204.

Referring now to operation (350), and in some embodiments, access to the application 204 can be allowed. In some embodiments, the firewall logic 208 can allow or provide access to the application 204 executing on the device 202 based in part on the firewall rules 216 or a level of access assigned. For example, the firewall logic 208 can allow or enable the application 204 to receive data or transmit data to an API 234, an IP address (or group of IP addresses), a domain name or a server 230 based in part on the firewall rules 216 or a level of access assigned. In some embodiments, responsive to the filtering, the firewall logic 208 can redirect the network traffic or data corresponding to the API 234 or application 204 executing on the device 202. For example, the firewall logic 208 can redirect network traffic or data from the API 234, corresponding to the API 234 or application 204 executing on the device 202.

In some embodiments, the firewall logic 208 can use the firewall rule 216 to identify a firewall action 220 including instructions to redirect network traffic or data to be transmitted by or received at the application 204 executing on the device 202 to a different IP address, domain name, or subnet address. For example, the firewall logic 208 can redirect network traffic or data from an IP address (or group of IP addresses) from a first subnet address or first endpoint to a second, different subnet address or second, different endpoint. The firewall logic 208 can redirect network traffic or data from a domain name (or group of domain names) from a first subnet address or first endpoint to a second, different subnet address or second, different endpoint. In some embodiments, the firewall logic 208 can identify different portions of network traffic or data corresponding to an API 234, application 204 or server 230 and redirect one or more portions of the network traffic or data to different endpoints. For example, the firewall logic 208 can identify a first portion of the network traffic or data from a first group of IP addresses having a first level of access to the device 202 and a second portion of the network traffic from a second group of IP addresses having a second level of access to the device 202. The first level of access can be different from the second level of access. In some embodiments, the firewall logic 208 can redirect the second portion of the network traffic or data from the second group of IP addresses from a first subnet address to a second subnet address. In some embodiments, the firewall logic 208 can redirect the second portion of the network traffic or data from the second group of IP addresses from a first domain name to a second domain name. The firewall logic 208 can determine a correct endpoint, subnet address or domain name to redirect the network traffic or data using the firewall rules 216.

In some embodiments, responsive to identifying network traffic or data as allowed, the firewall logic 208 can redirect the restricted network traffic or data to the firewall manager 214. For example, the firewall logic 208 can couple with or work in parallel with the firewall manager 214 to filter, monitor, and/or redirect network traffic or data corresponding to the application 204. The firewall manager 214 can correspond to a VPN or micro VPN network. The firewall manager 214 can include the same firewall rules 216 as the firewall logic 208, additional firewall rules 216 to the firewall logic 208 or different firewall rules 216 to the firewall logic 208.

In some embodiments, the firewall manager 214, a firewall on the device 202, and the firewall logic 208 can work in parallel or otherwise together to provide more control over network traffic or data received at or transmitted by the application 204 executing on the device 202. For example, data limits such as a maximum number of data per day or per session can be assigned to the application 204 based in part on the firewall rules 216. The firewall manager 214, a firewall on the device 202, and the firewall logic 208 can work in parallel or otherwise together to filter, monitor, and/or redirect the data corresponding to the application 204. The data processed at each of the firewall manager 214, a firewall on the device 202, and the firewall logic 208 can count towards the data limit for the application 204. The data limits (e.g., data quotas) can be established by the firewall manager 214 using the firewall rules 216.

Referring now to operation (355), and in some embodiments, responsive to the determination, if the network traffic is restricted, the network traffic can be identified as restricted. For example, the firewall logic 208, using the firewall rules 216 can determine that the network traffic or data is restricted or not allowed. In some embodiments, the firewall logic 208 can use the firewall rule 216 to identify a firewall action 220 including instructions to restrict or prevent the network traffic or data to be transmitted by or received at the application 204 executing on the device 202. The firewall rules 216 can indicate that the application 204 should not receive network traffic or data from an IP address, a domain name, the API 234, or a server 230. The firewall rules 216 can indicate that the application 204 should not transmit network traffic or data to an IP address, a domain name, the API 234, or a server 230. In some embodiments, the firewall logic 208 can identify a restricted IP address (or restricted group of IP addresses), a restricted data type, a restricted domain name, a restricted API 234, or a restricted server 230. The firewall logic 208 can, using the firewall action 220, prevent or block network traffic or data from the restricted IP address (or restricted group of IP addresses), restricted data type, restricted domain name, restricted API 234, or restricted server 230. The firewall logic 208, using the firewall action 220, can prevent or block network traffic or data from being transmitted to the restricted IP address (or restricted group of IP addresses), restricted data type, restricted domain name, restricted API 234, or restricted server 230.

Referring now to operation (360), and in some embodiments, access to the application 204 can be prevented. For example, the firewall logic 208 can prevent or block the application 204 executing on the device 202 from transmitting data to a restricted group of IP addresses responsive to the firewall rules 216 or from receiving data from the restricted group of IP addresses responsive to the firewall rules 216. The firewall logic 208 can prevent or block access to the application 204 at the application 204 itself. For example, in some embodiments, the firewall logic 208 can prevent or block access to the application 204 independent of the firewall manager 214 or the device 202 (e.g., local operating system of device 202). In some embodiments, responsive to preventing network traffic or data from the restricted IP address (or restricted group of IP addresses), restricted data type, restricted domain name, restricted API 234, or restricted server 230, the firewall logic 208 can generate an error message to the device 202 or user of the device 202. The error message can be generated by the firewall logic 208 responsive to applying the firewall policies to the network traffic or data corresponding to the restricted IP address (or restricted group of IP addresses), restricted data type, restricted domain name, restricted API 234, or restricted server 230.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method comprising;
   causing compilation of an application to modify the application to include logic in the application, the application modified to install logic on a device responsive to execution of the application, the logic configured to apply one or more rules to process network traffic via one or more application programming interfaces (APIs) of the application;
   causing execution of the compiled application to install the logic on the device to hook calls of the one or more APIs of the application that process network traffic; and
   applying, during execution of the compiled application, a rule of the one or more rules of the logic to network traffic received vi an API of the one or more APIs of the application.

2. The method of claim 1, further comprising compiling the application to inject the logic into a binary form of the application.

3. The method of claim 2, further comprising using a wrapping toolkit to inject the logic into the binary form.

4. The method of claim 1, further comprising compiling source code of the application that includes the logic.

5. The method of claim 1, wherein the one or more rules are obtained from a second device during at least one of compilation or execution.

6. The method of claim 1, wherein the application is a mobile application.

7. The method of claim 1, wherein the application is configured to execute on a mobile device.

8. A method comprising:
   causing execution of an application that has been modified during compilation to include logic in the application, and prior to execution of the application, the application modified to cause a device to install the logic responsive to execution of the application on the device, the logic configured to apply one or more rules to process network traffic via one or more application programming interfaces (APIs) of the application;
   hooking by the logic of the application responsive to execution of the application, one or more application programming interfaces (APIs) of the application that process network traffic; and
   applying, by the logic, an action to network traffic responsive to detecting an API of the one or more APIs of the application has been called.

9. The method of claim 8, further comprising hooking by the logic the one or more APIs of the application when the one or more APIs are called.

10. The method of claim 8, wherein the action comprises one of the following:
    blocking one of a type of destination or a type of data, forwarding network traffic of the API call to a monitor service, and redirecting a domain name or internet protocol address from a remote location to a local location.

11. The method of claim 8, wherein the application is a mobile application.

12. The method of claim 8, wherein the application is configured to execute on a mobile device.

13. The method of claim 8, wherein the logic is configured to provide a firewall.

14. A system comprising:
    one or more processors, coupled to memory; to:
    execute an application that has been modified during compilation to include logic in the application, and prior to execution of the application, the application modified to cause the one or more processors to install the logic responsive to execution of the application, the logic configured to apply one or more rules to process network traffic via one or more application programming interfaces (APIs) of the application;
    cause the logic of the application, responsive to execution of the application, to hook one or more application programming interfaces (APIs) of the application that process network traffic; and
    cause the one or more rules to take an action on network traffic being processed by the one or more APIs of the application.

15. The system of claim 14, wherein the one or more processors are further configured to cause compilation of the application to modify the application to install logic on the one or more processors responsive to execution of the application.

16. The system of claim 15, wherein the one or more processors are further configured to compile the application to inject the logic into a binary form of the application.

17. The system of claim 16, wherein the one or more processors are further configured to use a wrapping toolkit to inject the logic into the binary form.

18. The system of claim 16, wherein the one or more processors are further configured to cause the logic to hook the one or more APIs of the application when the one or more APIs are called.

19. The system of claim 14, wherein the action comprises one of the following:
 blocking one of a type of destination or a type of data, forwarding network traffic of an API call to a monitor service, and redirecting a domain name or internet protocol address from a remote location to a local location.

20. The system of claim 14, wherein the application is configured to execute on a mobile device.

* * * * *